US011493991B2

(12) United States Patent
Kozlowski

(10) Patent No.: US 11,493,991 B2
(45) Date of Patent: Nov. 8, 2022

(54) REFLECTIVE LENS HEADSET CONFIGURATION DETECTION

(71) Applicant: Mira Labs, Inc., Los Angeles, CA (US)

(72) Inventor: Mike Kozlowski, Los Angeles, CA (US)

(73) Assignee: Mira Labs, Inc., Los Angeles, CA (US)

( * ) Notice: Subject to any disclaimer, the term of this patent is extended or adjusted under 35 U.S.C. 154(b) by 0 days.

(21) Appl. No.: 17/321,398

(22) Filed: May 14, 2021

(65) Prior Publication Data

US 2021/0271316 A1 Sep. 2, 2021

Related U.S. Application Data

(63) Continuation of application No. PCT/US2019/062071, filed on Nov. 18, 2019.

(60) Provisional application No. 62/768,837, filed on Nov. 16, 2018.

(51) Int. Cl.
G02B 27/01 (2006.01)
G06F 3/01 (2006.01)

(52) U.S. Cl.
CPC ......... G06F 3/012 (2013.01); G02B 27/0176 (2013.01); G02B 2027/014 (2013.01); G02B 2027/0178 (2013.01); G02B 2027/0198 (2013.01)

(58) Field of Classification Search
CPC ... G06F 3/012; G02B 27/017; G02B 27/0176; G02B 2027/014; G02B 2027/0178; G02B 2027/0198
See application file for complete search history.

(56) References Cited

U.S. PATENT DOCUMENTS 5,642,177 A * 6/1997 Nishioka .................. G02C 5/08
351/44
9,097,890 B2 * 8/2015 Miller ...................... G06F 3/011
9,274,340 B2 * 3/2016 Lyons ...................... G06F 3/011
2012/0169327 A1 * 7/2012 Parco ...................... G06K 19/12
324/244
2015/0199064 A1 * 7/2015 Cho ....................... G06F 3/0416
345/173

OTHER PUBLICATIONS

EPO—European Patent Office Search Report and Opinion, dated Jun. 24, 2022.

* cited by examiner

Primary Examiner — Amare Mengistu
Assistant Examiner — Cory A Almeida
(74) Attorney, Agent, or Firm — Buchalter, A Professional Corporation

(57) ABSTRACT

A system and method for detecting a condition of an augmented reality system and/or controlling an aspect of the augmented reality system.

22 Claims, 4 Drawing Sheets

REFLECTIVE LENS HEADSET CONFIGURATION DETECTION

PRIORITY

This application claims the benefit of priority under 35 U.S.C. § 119(e) to Provisional Application No. 62/768,837, filed on Nov. 16, 2018 and PCT Application No. PCT/US19/62071, filed on Nov. 18, 2019, which are incorporated by reference in their entirety.

BACKGROUND

Head Mounted Displays (HMDs) produce images intended to be viewed by a single person in a fixed position related to the display. HMDs may be used for Virtual Reality (VR) or Augmented Reality (AR) experiences. The HMD of a virtual reality experience immerses the user's entire field of vision and provides no image of the outside world. The HMD of an augmented reality experience renders virtual, or pre-recorded images superimposed on top of the outside world.

U.S. application Ser. No. 15/944,711, filed Apr. 3, 2018, is incorporated by reference in its entirety herein, and describes exemplary augmented reality systems in which a planar screen, such as that from a mobile device or mobile phone, is used to generate virtual objects in a user's field of view by reflecting the screen display on an optical element in front of the user's eyes. FIG. 1 corresponds to FIG. 1 of the cited application and FIG. 2 corresponds to FIG. 3 of the cited application. FIG. 1 illustrates an exemplary headset for producing an augmented reality environment by reflecting images from a display off an optical element and into the user's eye to overlay virtual objects within a physical field of view. The exemplary headset 10 of FIG. 1 includes a frame 12 for supporting a mobile device 18 with a display 22, and optical element 14, and a mounting system 16 to attach the display and optical element to the user. FIG. 2 illustrates exemplary light paths from the display screen 22, off the optical element 14, and into a user's eye.

Exemplary embodiments of an augmented reality headset include using a mobile device of the user inserted into the headset frame. In order to render the virtual object correctly within the field of view of the user, the display screen of the mobile device must be positioned properly within the frame. If the mobile device is upside down, then the images will similarly be displayed upside down to the user. If the mobile device is not fully or properly seated within the frame, the displayed virtual image may be distorted as the relationship between the display, the reflective lens, and the user's eye will be misaligned.

SUMMARY

Exemplary embodiments described herein include a headset system having a frame configured to support a mobile device of a user, and an optical element coupled to the frame configured to reflect an image displayed by the mobile device to the user. An attachment mechanism between the frame and optical element may include a plurality of magnets. Exemplary embodiments may also or alternatively include other attachment methods for the optical element, while maintaining magnets within the frame for use in the methods described herein.

Exemplary embodiments include a system and method of detecting the magnets within the frame by a magnetometer within the mobile device of the user. Exemplary embodiments, may include using the effects of the magnets on the magnetometer readings to determine a position of the phone and/or headset. Exemplary embodiments may include altering a condition of the virtually rendered object, providing a message to the user, controlling a feature of the augmented reality system and/or display based on the determined position of the phone and/or headset.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Figure 1:
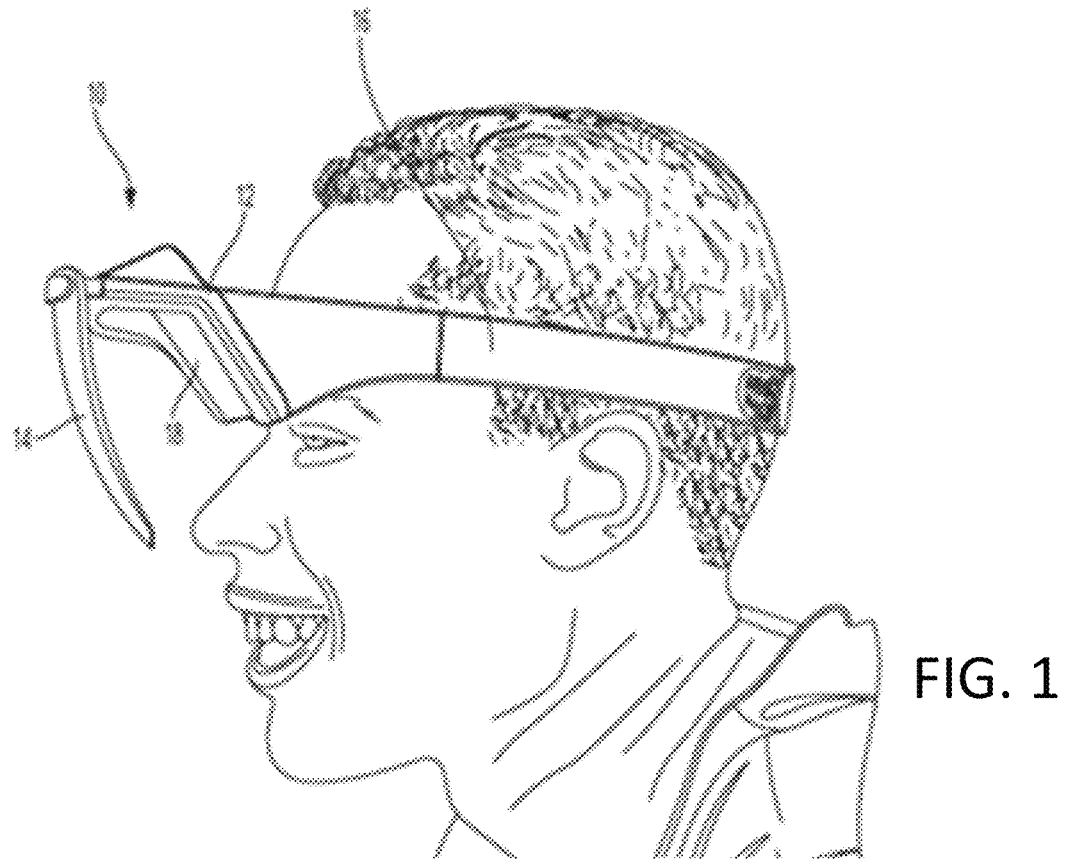
FIG. 1 illustrates an exemplary augmented reality system.
Figure 2:
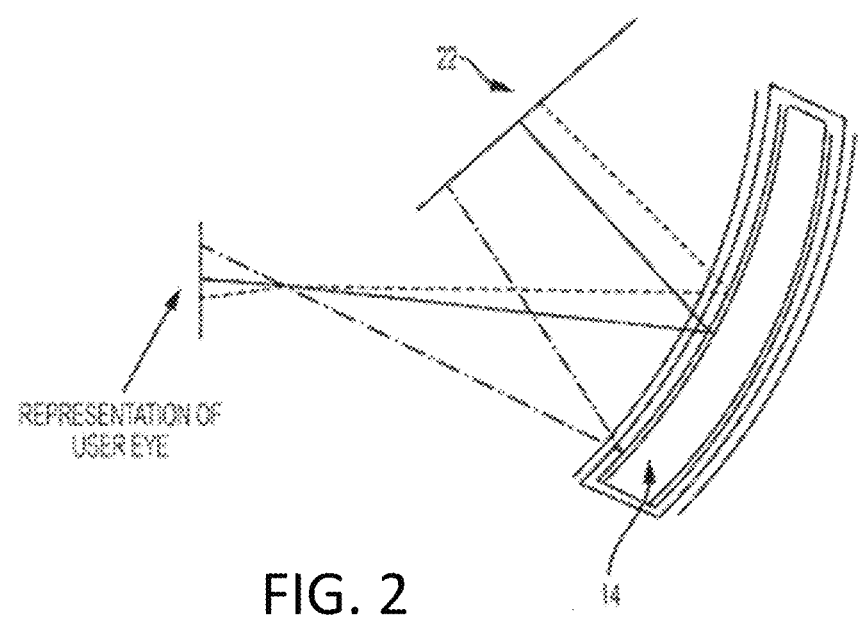
FIG. 2 illustrates an exemplary ray tracing for use of an augmented reality system according to embodiments described herein.
Figure 3:
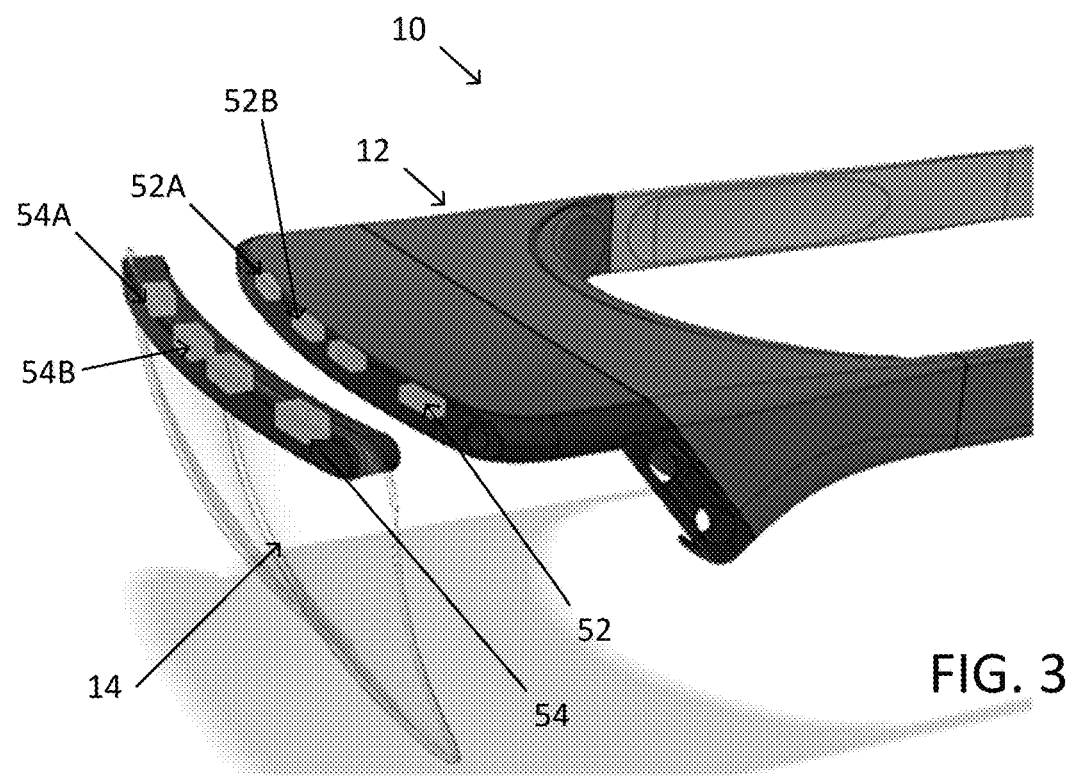
FIGS. 3-5 illustrate an exemplary augmented reality system described herein.

As seen in FIG. 3, an exemplary embodiments described herein include a headset 10 system, having a frame 12 with a compartment configured to support a mobile device, and an optical element 14 coupled to the frame configured to reflect an image displayed on the mobile device. The headset 10 may include an attachment mechanism between the frame and the optical element for removable and/or pivotable attachment of the optical element to the frame. The attachment mechanism and/or frame may include one or more magnets.

Figure 4:
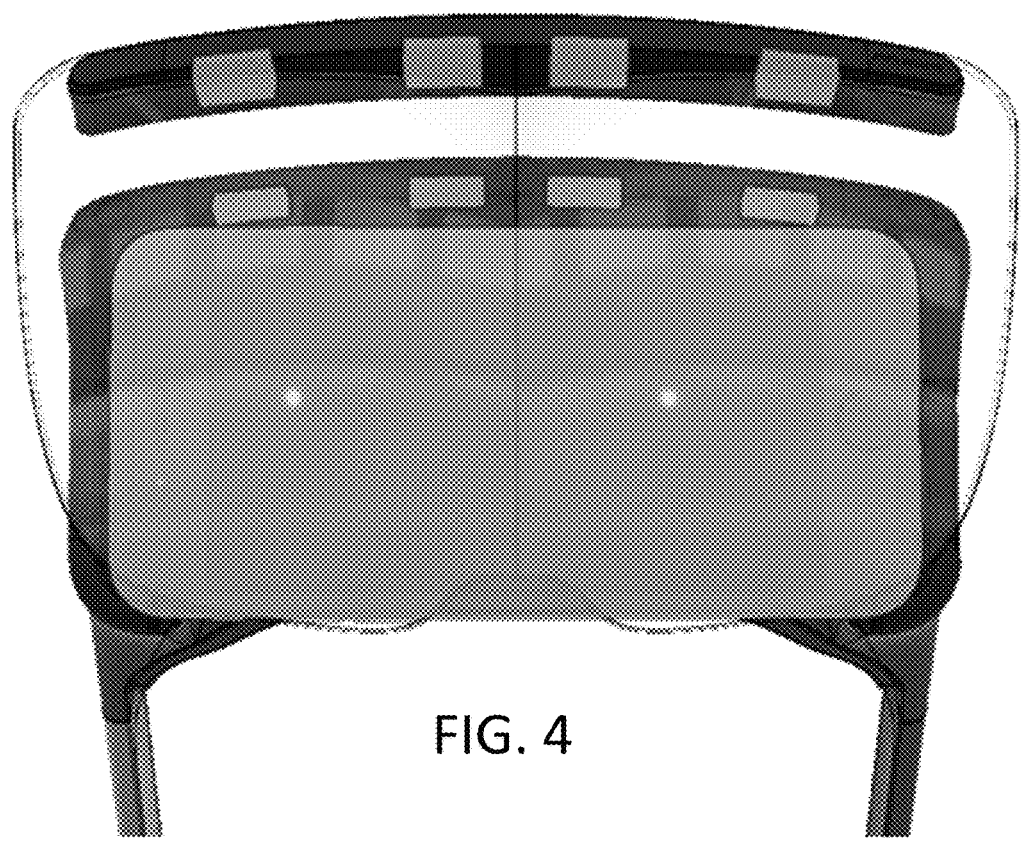
Figure 5:
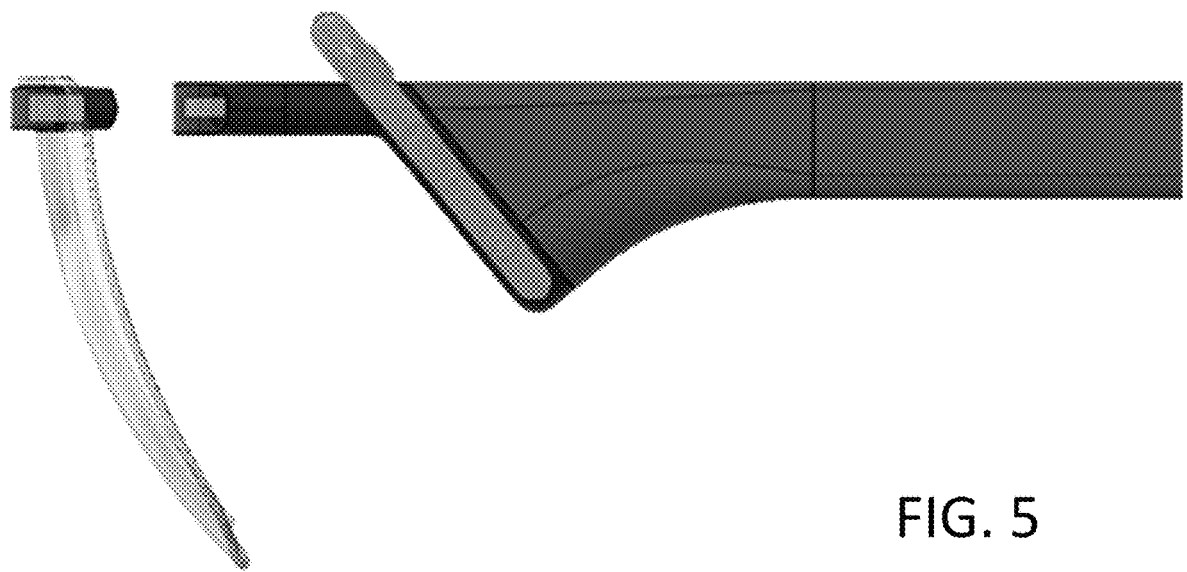

FIGS. 3-5 illustrate exemplary embodiments of magnetic arrangements between a lens assembly, such as an optical element 14, and headset 12 that may be used to support and attached one to the other. As illustrated in FIG. 3, the frame 12 may include one or more magnets 52, the lens assembly may include one or more magnets 54, or a combination of the frame and lens assembly may each include one or more magnets. The magnets may define corresponding attractive pairs between the frame and the lens assembly. For example, a first magnet 52A on the frame may be configured to attract and couple with a first magnet 54A on the lens assembly. The magnets may be configured to attract each other in a desired relative placement of the frame with respect to the lens assembly.

In an exemplary embodiment, the magnets may change polarity orientations, such that each magnet on the headset may have a polarity in a given orientation (such as outward or toward the lens or to one side or the other). A first one or set of magnets 52A or 54B may define a first polarity orientation, and a second one or set of magnets 52B or 54A may define a second polarity orientation. The first polarity orientation may be in an opposite direction than the second polarity orientation. The first one of the magnets may be adjacent a second one of the magnet, or the first set of magnets may alternate with the second set of magnets. The arrangement of polarity opposites may not switch on every other magnet, but may be grouped, such as the outside magnets may have a first orientation and the inside magnets may have a second orientation.

In an exemplary embodiment, the attachment mechanism may include a first plurality of magnets 52 in a first part or attachment mechanism of the frame and a second plurality of magnets 54 in a second part or attachment mechanism of the optical element wherein adjacent ones of the first plurality of magnets 52A, 52B alternate orientations such that the first plurality of magnets alternate polarity in a forward facing direction. The second plurality of magnets 54 may be positioned and oriented such that each of the second plurality of magnets aligns and mates with one of the first plurality of magnets, and the second plurality of magnets have an opposing polarity directed toward a corresponding one of the first plurality of magnets.

As shown, the first part of the frame and the second part of the optical element are magnetic. In an exemplary embodiment, the first part and second part may each include a plurality of magnetic elements. The magnetic elements may alternate in polarity along a length of the respective component. The first part and second part may have magnetic elements of opposite polarity along their length, such that the corresponding magnetic elements of each component matably attract. The opposing polarities within the same component may be used to align the optical element to the frame. In an exemplary embodiment, the optical element and the frame each have four magnetic elements.

In an exemplary embodiment, a mobile device application is installed on the mobile device to receive the magnetometer readings of the mobile device. The magnets within the frame in the headset may affect the magnetometer in the mobile device and may be used to determine the mobile device's orientation in the headset and/or the configuration of the headset. For example, exemplary embodiments may be used to detect the configuration of the headset and/or phone including: (1) that the mobile device is not in the headset; (2) that the mobile device is upside-down in the headset with the lens off; (3) that the mobile device is in the headset in the correct orientation with the lens off; (4) that the mobile device is in the headset upside-down with the lens on; and/or (5) that the mobile device is in the correct orientation with the lens on.

Exemplary embodiments include detecting the orientation of the inserted mobile device to correspond the up-down orientation of the display appropriately and render virtual objects according to the orientation of the mobile device in the frame. For example, when the mobile device is detected in a first orientation, the virtual objects are rendered in a first position, but when the mobile device is detected in the second orientation, the virtual objects are rendered in a second position, in which the first position and the second position are rotated on the screen to translate the up-down orientation of the virtual objects.

Exemplary embodiments include detecting whether the lens/optical element is positioned or coupled to the headset frame. Exemplary embodiments include controlling the display of the mobile device depending on the state of the lens relative to the headset frame. For example, if the lens is off of the frame, then the display and/or application running on the display may be suspended, dimmed, or otherwise altered to reduce power consumption. If the lens is on the frame, then the display and/or application may be launched, unpaused, or configured to render virtual objects to the user.

Exemplary embodiments include software controls for a mobile device of a user to switch display configurations depending on the determined configuration of the headset including the phone orientation within the headset, and/or the lens attachment to the headset. Exemplary embodiments of the software controls are configured to display a prompt or instruction to the user to configure the headset in a certain way, such as by connecting the lens and/or rotating and/or reinserting the mobile device. Exemplary embodiments of the software controls are configured to automatically rotate a screen display based on the determined configuration of the mobile device within the headset. Exemplary embodiments of the software controls are configured to change a display configuration of the mobile device based on the detected configuration of the lens to the headset. The change in display configuration may include pausing a display or application, dimming or turning of a screen display, or other function when the determined state includes the lens out of contact with the headset. Exemplary embodiments of the software controls are configured to automatically switch between two-dimensional touchscreen user interfaces for controlling/selecting applications on the mobile device to/from a three dimensional stereoscopic augmented reality display configuration for use in rendering virtual objects for overlay through the reflection off of the optical element depending on the attachment of the optical element to the headset.

Figure 6:
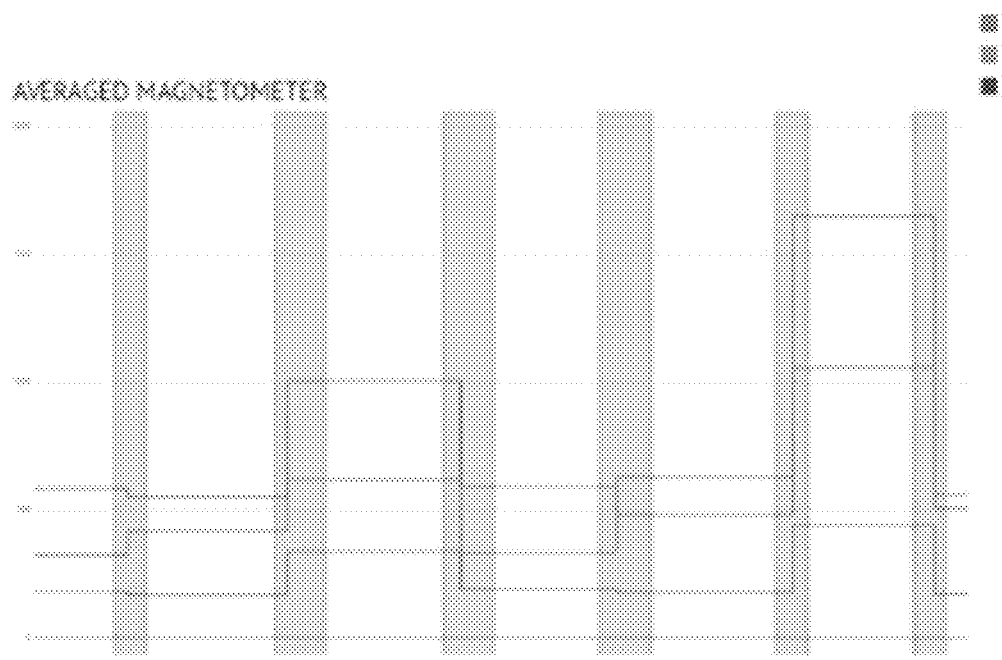
FIGS. 6-7 illustrate exemplary magnetometer readings used to determine an condition of an augmented reality system according to embodiments described herein.
Figure 7:
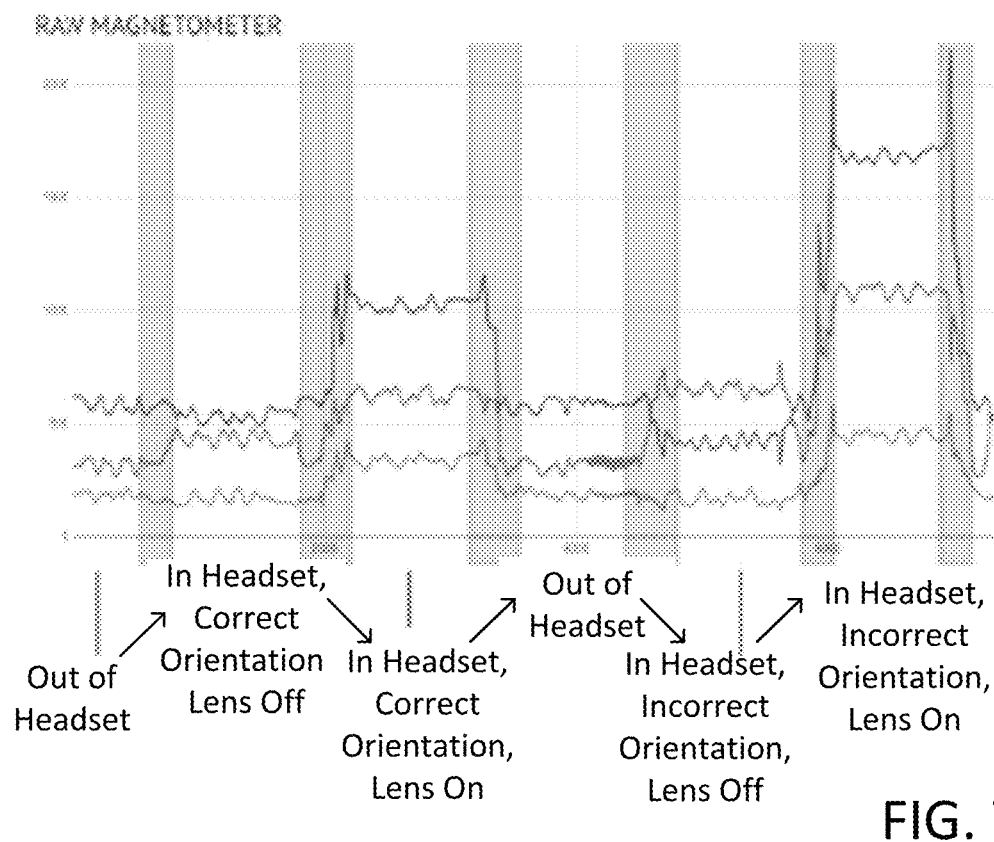

FIGS. 6-7 illustrate exemplary raw and averaged magnetometer readings taken from a user's mobile device under various identified conditions of the headset, including: the mobile device out of the headset, the mobile device in the headset in the correct orientation with the lens off, the mobile device in the headset in the correct orientation with the lens on, the mobile device out of the headset, the mobile device in the headset in an incorrect orientation with the lens off, and the mobile device in the headset in an incorrect orientation with the lens on. The incorrect orientation is an inverted or upside down orientation within the frame from or as compared to a predefined orientation of the mobile device relative to the headset.

Exemplary embodiments include measuring differentials in magnetometer readings as opposed to taking raw values from the magnetometer. The differential or comparison to a baseline detected magnetometer reading may account for variations in user geographical locations. In an exemplary embodiment, the differentials between states are used over the absolute values of the states because the absolute values may change by geography (as the strength of the magnetic field varies by latitude), but the direction of the differentials may be independent of location.

In an exemplary embodiment, the software control according to embodiments described herein detect and/or receive values from the mobile device magnetometer. The software control uses the x magnetometer value and the z magnetometer value. The software control first determines whether the phone is in a "resting state," whether the phone's magnetometer has been relatively still for a period of time, such as 1-3 seconds. The resting state is determined by comparing history of delta values on the x and z readings to determine whether changes in these values are under a given threshold for a predetermined amount of time. During a period of rest, an average value of x magnetometer reading and z magnetometer reading may be calculated, and/or stored, and/or continuously updated. Exemplary embodiments may use the resting average of x and z magnetometer readings as a first baseline. When the device is determined to be in a state of unrest, when the average of the delta values exceed the threshold, the first baseline is saved in memory and the software control discontinues updating and/or storing this value. When the phone enters the next rest state, an updated average x magnetometer reading and average z magnetometer reading is determined and stored as a second baseline. The second baseline is compared against the first baseline. If the difference between the first and second baseline falls within a predetermined window, the phone's orientation can be determined. For example, putting the phone into the headset upside down, with the lenses off, will yield a change of approximately −100 on the z magnetometer reading and +350 on the x magnetometer reading for an iPhone 6. The software control is therefore configured to compare the second baseline to the first baseline and determine a configuration of the headset when the difference in baseline is within a predefined range. A first predefined range may indicate the mobile device is inserted in a first orientation and the lens is off the headset; a second predefined range may indicate the mobile device is inserted in a first orientation and the lens is on the headset, a third predefined range may indicate the mobile device is inserted in a second orientation and the lens is off the headset, and a fourth predefined range may indicate the mobile device is inserted in the second orientation and the lens is on the headset. The first orientation and second orientation of the mobile device within the headset may be upside down or rotationally offset by 180 degrees.

Exemplary embodiments may use different threshold values and/or sampling rates. For example, a sampling rate may be 60× per second. The sampling rate may be variable or static. In an exemplary embodiment, the sampling rate may be based on a condition of the system, such as device limitations. An average of 60 frames, approximately a second, may be used for an average. Sampling rates may change depending on the state of the device, such as once proper orientation is detected and the device is determined to be in use, the sampling rate may decrease, but still monitor to detect and respond to changes in system conditions. Resting state may be determined by summation of delta absolute value magnetometer readings over the course of the sampling period.

Although embodiments of the invention may be described and illustrated herein in terms of augmented reality systems, it should be understood that embodiments of this invention are not so limited, but are additionally applicable to virtual reality systems. Features of the system may also be applicable to any head mounted system. Exemplary embodiments may also include any combination of features as described herein. Therefore, any combination of described features, components, or elements may be used and still fall within the scope of the instant description. Exemplary embodiments are described herein with respect to specific magnet and detector orientations. The system is not so limited and the present invention encompasses different orientations or detection schemes such that a state of the system may be determined by detecting the magnetic field and/or relative change of the magnetic field of the system.

Exemplary embodiments may also include any combination of features as described herein. Therefore, any combination of described features, components, or elements may be used and still fall within the scope of the instant description. For example, features may include the computing for the augmented reality experience is conducted by a smartphone inserted into the headset; the front-facing camera of an inserted smartphone has an unobstructed view through the optical element; the tracking is accomplished using information from the smartphone's front-facing camera; an output is displayed on the smartphone's screen; the optical element acts as a combiner that reflects the smartphone's screen to overlay imagery in the user's physical field of vision; the headset having only a single optical element in which light from the screen encounters between the screen and the user's eye; the headset not having any additional optical components for creating, generating, or overlaying the digital image in a user's field of view besides the optical element; the smartphone and optical element are in a fixed position during operation; the headset or system including inserts for fixing the position of an inserted mobile device during operation; the headset including dynamically adjustable mechanism for accommodating inserted mobile devices of various size; the headset including an elastic cover to shield the screen and retain the mobile device relative to the headset; the headset including retaining features to position the inserted mobile device; the headset no including computing power besides the phone; the optical element is removable; the optical element can fold for storage or transportation relative to the compartment; the optical element consists of two sub-components to display stereoscopic imagery; the optical element including a coating on a first surface to reflect an image from the mobile device; the optical element including an anti-reflective coating on another surface to reduce reflection of an image from the mobile device; the optical element including a spherical curvature; the optical element having a uniform thickness; the optical element contains magnets and the compartment or a frame contains mating magnets that allow the optical element to attach and detach from the frame of the headset such that it is always in the correct positioning; integrated or removable straps or band secure the headset to a user's face; the compartment having a face cushion for comfort during use; the compartment having an integrated optical component covering the front-facing camera of the smartphone; the integrated optical component covering the front-facing camera of the smartphone modifies the image entering the front-facing camera to improve tracking area; the optical component is a prism; the optical component is a wide-angle lens; the mounting system including modular straps and support frames; the mounting system straps including surface features to increase structural support; the mounting system support features including an indentation on a broad side of the strap toward a user's head; The mounting system straps including tapered thickness; the mounting system including keyed mating surfaces to define an orientation or a mated pair; and any combination thereof or otherwise described herein.

Although embodiments of this invention have been fully described with reference to the accompanying drawings, it is to be noted that various changes and modifications will become apparent to those skilled in the art. Such changes and modifications are to be understood as being included within the scope of the present disclosure as defined by the appended claims. Specifically, exemplary components are described herein. Any combination of these components may be used in any combination. For example, any component, feature, step or part may be integrated, separated, sub-divided, removed, duplicated, added, or used in any combination with any other component, feature, step or part or itself and remain within the scope of the present disclosure. Embodiments are exemplary only, and provide an illustrative combination of features, but are not limited thereto.

Exemplary embodiments may include an augmented reality system, including an augmented reality headset having a magnet; and a mobile device application configured to be stored in memory of a mobile device that, when executed by a processor of the mobile device is configured to: receive a reading from a magnetometer, and determine a condition of the augmented reality system.

Exemplary embodiments include a method for determining a condition of an augmented reality system, including providing an augmented reality system; and providing a mobile application configured to be stored on a mobile device and when executed by a processor of the mobile device determine the condition of the augmented reality system. The method may also include inserting the mobile device having the mobile device application saved thereon into the augmented reality system, the mobile device application configured to, when executed by the mobile device, to perform the steps of: receive a value from a magnetometer of the mobile device, and determine the condition of the augmented reality system. The method may also include changing a reading detected by the magnetometer by changing a condition of the augmented reality system.

The augmented reality system may include a frame for supporting an inserted mobile device and an optical assembly for reflecting an image from a display of the mobile device into a wearer's eye. The optical assembly may be configured to couple to the frame. The frame may include the magnet, and the optical assembly may include another magnet. The frame magnet and the other optical assembly magnet may be used to couple the optical assembly to the frame.

The system and/or method may include the mobile device application being configured to determine the condition of the augmented reality system comprises determining (1) that the mobile device is not in the headset; (2) that the mobile device is in a first orientation in the frame and the optical assembly is not attached to the frame; (3) that the mobile device is in the frame in a second orientation relative to the frame and the optical assembly is not attached to the frame; (4) that the mobile device is in the frame in the first orientation with the optical assembly coupled to the frame; (5) that the mobile device is in the second orientation in the frame correct orientation with the lens on; or (6) a combination thereof. For example, the system may determine the condition of the augmented reality system by detecting the orientation of the mobile device inserted into the augmented reality headset and determine the up-down orientation of a display of the mobile device relative to the augmented reality headset. The mobile device application may also be configured to render virtual objects according to the up-down orientation of the mobile device in the frame. As another example, the system may determine the condition of the augmented reality system by detecting the orientation of the mobile device inserted into the augmented reality headset and determine the up-down orientation of a display of the mobile device relative to the augmented reality headset, and the mobile device application is configured to render virtual objects according to the up-down orientation of the mobile device in the frame.

The system and/or method may also detect the presence of the optical assembly. The mobile device application may be configured to control a display of the mobile device based on the detected presence of the optical assembly. Controlling the display of the mobile device may include rendering an optical element for display to a user when the lens assembly is determined as present relative to the frame.

The system and/or method may also determine a series of differential magnetometer readings relative to a baseline magnetometer reading.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realising the invention in diverse forms thereof.

The invention claimed is:

1. An augmented reality system, comprising:
   an augmented reality headset having an attachment mechanism including plurality of magnets in fixed positions arranged to detachably capture an optical assembly; and
   a mobile device application configured to be stored in memory of a mobile device having a magnetometer, the application when executed by a processor of the mobile device:
   receives readings from the magnetometer responsive to detecting the plurality of fixed-position magnets, and establishes an up-down orientation of a display of the mobile device relative to the headset and when received therein, and
   determines a condition of the augmented reality system.

2. The augmented reality system of claim 1, wherein the augmented reality headset includes the attachment mechanism having a frame for supporting the inserted mobile device and the optical assembly for reflecting an image from a display of the mobile device into a wearer's eye, the optical assembly being configured to be coupled to the frame.

3. The augmented reality system of claim 2, wherein the frame includes frame magnets of the plurality of magnets, and the optical assembly includes another magnet of the plurality in a position fixed to detachably capture the optical assembly by at least one of the frame magnets.

4. The augmented reality system of claim 3, wherein the frame magnet and the other magnet are used to couple the optical assembly to the frame.

5. The augmented reality system of claim 2, wherein the mobile device application determines the condition of the augmented reality system by further establishing:
   (1) that the mobile device is not in the headset;
   (2) that the mobile device is in a first orientation in the frame and the optical assembly is not attached to the frame;
   (3) that the mobile device is in the frame in a second orientation relative to the frame and the optical assembly is not attached to the frame;
   (4) that the mobile device is in the frame in the first orientation with the optical assembly coupled to the frame;
   (5) that the mobile device is in the second orientation in the frame in a correct orientation with the lens on; or
   (6) a combination thereof.

6. The augmented reality system of claim 1, wherein determines the condition of the augmented reality system further includes:
   the mobile device application is configured to render virtual objects according to an up-down orientation of the mobile device in the frame.

7. The augmented reality system of claim 1, wherein determines the condition of the augmented reality system further includes:

detecting the orientation of the mobile device inserted into the augmented reality headset and determining the up-down orientation of a display of the mobile device relative to the augmented reality headset; and wherein the mobile device application renders virtual objects according to the up-down orientation of the mobile device in the frame.

8. The augmented reality system of claim 2, wherein the determines the condition of the augmented reality system includes detecting the presence of the optical assembly.

9. The augmented reality system of claim 8, wherein the mobile device application is further configured to control a display of the mobile device based on the detected presence of the optical assembly.

10. The augmented reality system of claim 9, wherein controlling the display of the mobile device comprises rendering an optical element for display to a user when the optical assembly is determined as present relative to the frame.

11. The augmented reality system of claim 10, further comprising determining a series of differential magnetometer readings, responsive to detecting the plurality of magnets, relative to a baseline magnetometer reading.

12. A method for determining a condition of an augmented reality system, comprising:
providing an augmented reality system having a headset incorporating an attachment mechanism that includes plurality of magnets in fixed positions arranged to detachably capture an optical assembly;
providing a mobile application configured to (a) be stored on a mobile device, which incorporates a magnetometer, and (b) when executed by a processor of the mobile device that upon receiving readings from the magnetometer responsive to detecting the plurality of fixed-position magnets:
establish an up-down orientation of a display of the mobile device relative to the headset when received therein, and
determines the condition of the augmented reality system.

13. The method of claim 12, further comprising:
inserting the mobile device having the mobile device application saved thereon into the augmented reality system, the mobile device application configured to, when executed by the mobile device, to perform the steps of:
receive a value from a magnetometer of the mobile device responsive to detecting the plurality of fixed-position magnets.

14. The method of claim 13, further comprising changing the value detected by the magnetometer by changing a condition of the augmented reality system.

15. The method of claim 12, the augmented reality system comprising the attachment mechanism having a frame configured to support the mobile device and the optical assembly.

16. The method of claim 15, wherein the frame comprises a first magnet and the optical assembly comprises a second magnet in a position fixed to detachably capture the optical assembly by the first frame magnet, both of the plurality of magnets.

17. The method of claim 16, wherein the determines the condition of the augmented reality system further comprises establishing:
(1) that the mobile device is not in the frame;
(2) that the mobile device is in a first orientation in the frame and the optical assembly is not attached to the frame;
(3) that the mobile device is in the frame in a second orientation relative to the frame and the optical assembly is not attached to the frame;
(4) that the mobile device is in the frame in the first orientation with the optical assembly coupled to the frame;
(5) that the mobile device is in the second orientation in the frame in a correct orientation with the lens on; or
(6) a combination thereof.

18. The method of claim 16, wherein the determine the condition of the augmented reality system further includes:
detecting an orientation of the mobile device inserted into the augmented reality system;
determining the up-down orientation of a display of the mobile device relative to the headset; and
wherein the mobile device application renders virtual objects according to the up-down orientation of the mobile device in the frame.

19. The method of claim 16, wherein determining the condition of the augmented reality system includes detecting the presence of the optical assembly.

20. The method of claim 19, further comprising controlling a display of the mobile device based on the detected presence of the optical assembly.

21. The method of claim 19, wherein controlling the display of the mobile device comprises rendering an optical element for display to a user when the optical assembly is determined as present relative to the frame.

22. The method of claim 19, further comprising determining a series of differential magnetometer readings, responsive to detecting the plurality of magnets, relative to a baseline magnetometer reading.

* * * * *